(12) United States Patent
Huang et al.

(10) Patent No.: US 11,150,465 B2
(45) Date of Patent: Oct. 19, 2021

(54) LENS MODULE CAPABLE OF REDUCING VISIBILITY OF GHOSTS AND ELECTRONIC DEVICE USING THE SAME

(71) Applicant: HON HAI PRECISION INDUSTRY CO., LTD., New Taipei (TW)

(72) Inventors: Yu-Chiao Huang, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 16/743,199

(22) Filed: Jan. 15, 2020

(65) Prior Publication Data

US 2020/0348512 A1   Nov. 5, 2020

(30) Foreign Application Priority Data

Apr. 30, 2019   (CN) .......................... 201910360040.X (51) Int. Cl.
*G02B 9/00* (2006.01)
*G02B 27/00* (2006.01)
*G02B 7/02* (2021.01)

(52) U.S. Cl.
CPC ......... *G02B 27/0018* (2013.01); *G02B 7/021* (2013.01)

(58) Field of Classification Search
CPC ...... G02B 27/0018; G02B 7/021; G02B 1/11; G02B 13/001; G02B 13/00; G03B 30/00; G03B 11/00

USPC .......................................................... 359/738
See application file for complete search history.

(56) References Cited

U.S. PATENT DOCUMENTS

| 2012/0188647 A1 | 7/2012 | Tanaka et al. |
| 2014/0268365 A1* | 9/2014 | Nishio ..................... G02B 7/04 359/683 |

FOREIGN PATENT DOCUMENTS

| CN | 101470218 A | 7/2009 |
| CN | 101587197 A | 11/2009 |
| CN | 102621675 A | 8/2012 |
| CN | 105483618 | 4/2016 |
| CN | 208156277 U | 11/2018 |
| TW | 201312195 | 3/2013 |

* cited by examiner

*Primary Examiner* — James C. Jones
(74) *Attorney, Agent, or Firm* — ScienBiziP, P.C.

(57) ABSTRACT

A lens module includes a lens group and at least one coating film. The lens group includes a plurality of lenses arranged successively from an object side of the lens module to an image side of the lens module. Each lens has two effective surfaces. One effective surface is located on the object side of the lens module, and the other is located on the image side. The coating film formed on at least one of the effective surfaces. The coating film satisfies a first relationship: $B_1<0.5\%$; $B_2<0.35\%$. $B_1$ refers to a maximum value of a reflectivity of incident light incident on the effective surfaces. $B_2$ refers to an average value of the reflectivity of the incident light incident on the effective surfaces, a wavelength of the incident light being in a range of 490 nm to 620 nm.

19 Claims, 6 Drawing Sheets

PRIOR ART

LENS MODULE CAPABLE OF REDUCING VISIBILITY OF GHOSTS AND ELECTRONIC DEVICE USING THE SAME

FIELD

The subject matter of the application generally relates to a lens module.

BACKGROUND

Electronic devices, such as mobile phones, tablet computers or cameras, may have lens modules. The lens module may have at least one lens. A coating film is plated on the lens to regulate a reflectivity of the lens and reduce the visibility of ghosts. However, deviations of control parameters may occur during the plating of the coating film, which make the lenses to have different reflectivity. When light is incident on the lens, ghosts will occur on different lenses. The ghosts have different colors (such as green arcs). The ghosts may affect the imaging quality of the lens module.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 1:
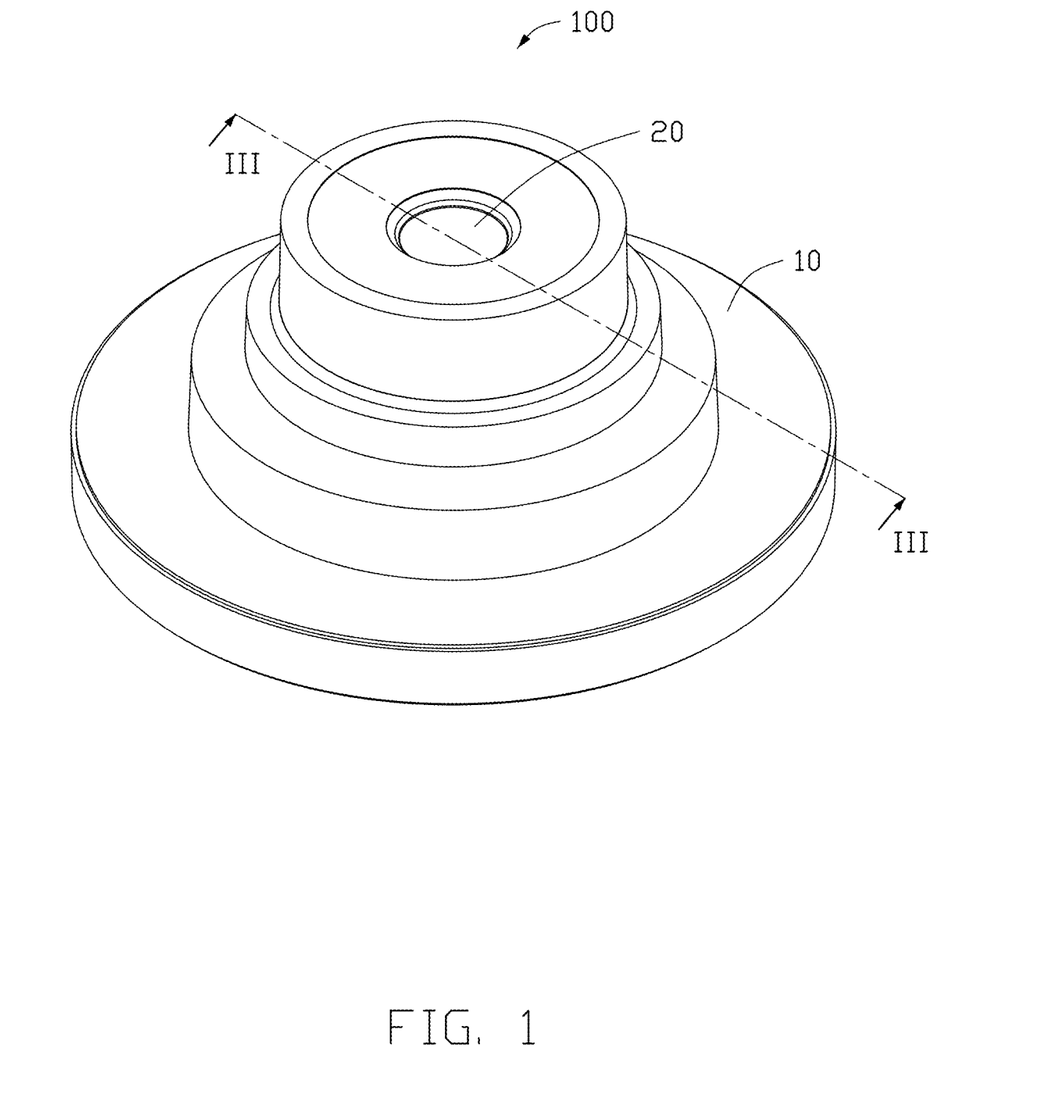
FIG. 1 is a perspective view of a first embodiment of a lens module according to the present disclosure.
Figure 2:
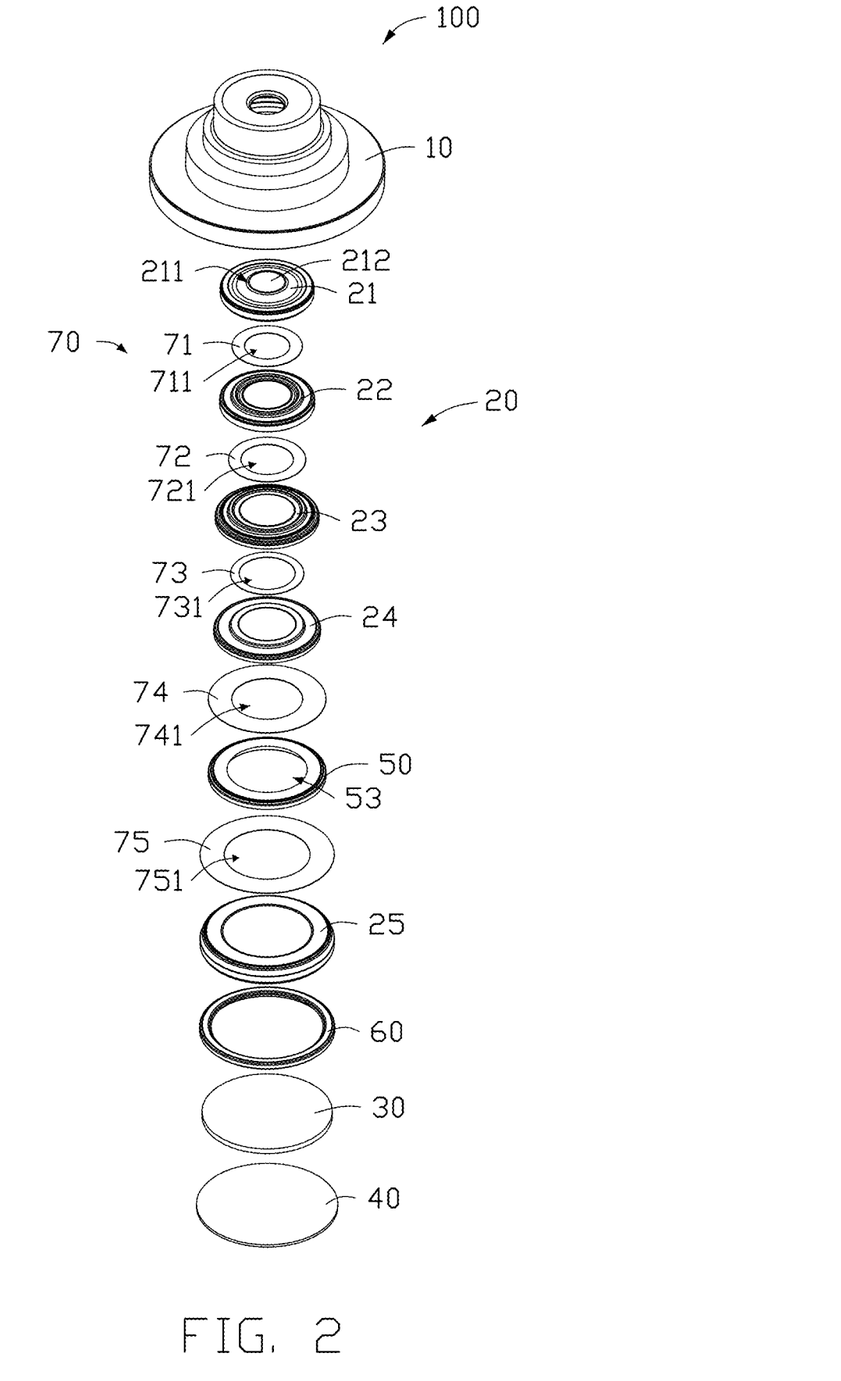
FIG. 2 is an exploded view of the lens module of FIG. 1.

FIGS. 1-2 show an embodiment of a lens module 100. The lens module 100 includes a lens cone 10, a lens group 20, a filter 30, a sensor 40, a gasket 50, a stopper 60, and a light-shielding sheet group 70.

The lens group 20, the filter 30, and the sensor 40 are sequentially arranged from an object side of the lens module 100 to an image side of the lens module 100. The lens group 20 is fixed in the lens cone 10. The filter 30 is formed on the sensor 40 and faces the lens group 20. The sensor 40 faces the lens group 20, too.

The lens group 20 includes a plurality of lenses arranged successively from an object side of the lens module 100 to an image side of the lens module 100. Each of the plurality of lenses has two effective surfaces. One of the two effective surfaces is located on the object side of the lens module 100, and the other one of the two effective surfaces is located on the image side of the lens module 100. At least one coating film is formed on at least one of the effective surfaces. The gasket 50 is formed between adjacent two of the plurality of lenses on the image side. The stopper 60 is closed to one of the plurality of lenses on the image side and fixed in the lens cone 10 to stop the lens group 20 from sliding out of the lens cone 10. The light-shielding sheet group 70 includes a plurality of light-shielding sheets. The plurality of light-shielding sheets of the light-shielding sheet group 70 is respectively formed between adjacent two lenses of the lens group 20, and formed between a last lens of the plurality of lenses from the object side to the image side and the gasket 50.

The coating film is used to reduce a reflectivity of the light incident on the lens of the lens group 20, thereby reducing a visibility of the ghosts and improving the imaging quality of the lens module 100.

Each of the at least one coating film satisfies a following relationships:

A first relationship: $B_1 < 0.5\%; B_2 < 0.35\%$.

A second relationship: $A_1 < 1\%; A_2 < 0.5\%$.

A third relationship:

$$\frac{A_1 + B_1}{2} < 0.6\%.$$

$B_1$ refers to a maximum value of a reflectivity of incident light incident on the effective surfaces with the at least one coating film thereon; and $B_2$ refers to an average value of the reflectivity of the incident light incident on the effective surfaces with the at least one coating film thereon, a wavelength of the incident light being in a range of 490 nm to 620 nm. $A_1$ refers to a maximum value of the reflectivity of the incident light incident on the effective surfaces with the at least one coating film thereon; and $A_2$ refers to an average value of the reflectivity of the incident light incident on the effective surfaces with the at least one coating film thereon, a wavelength of the incident light being in a range of 420 nm to 490 nm.

In at least one embodiment, the lens group 20 includes a first lens 21, a second lens 22, a third lens 23, a fourth lens 24, and a fifth lens 25. The first lens 21, the second lens 22, the third lens 23, the fourth lens 24, and the fifth lens 25 are sequentially mounted in the lens cone 10 from the object side of the lens module 100 to the image side of the lens module 100.

Figure 3:
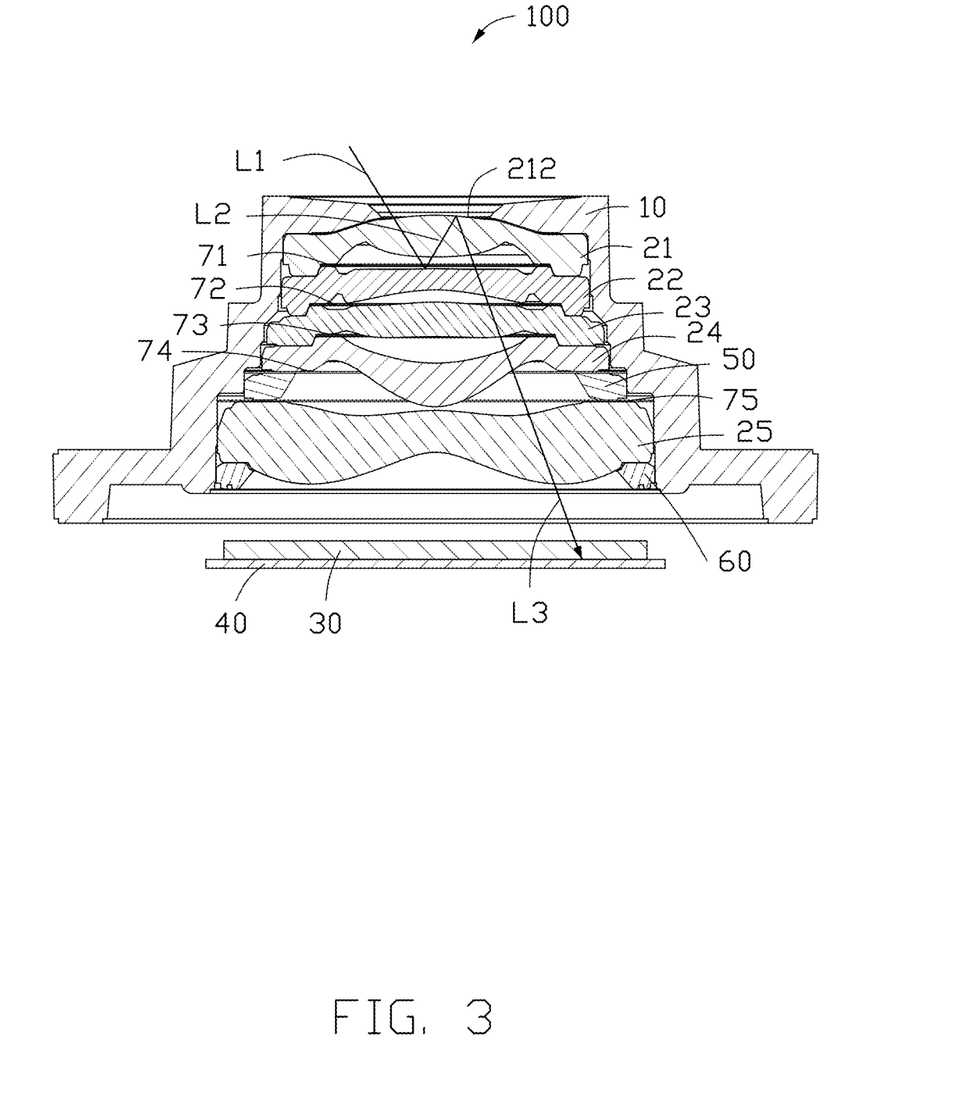
FIG. 3 is a cross-section view along a line of FIG. 1.

In at least one embodiment, the first lens 21 includes two effective surfaces 211. One of the effective surfaces 211 is located on an object side of the lens module 100, and the other is located on an image side of the lens module 100. A coating film 212 is formed on the effective surface 211 located on the object side of the lens module 100. In other embodiments, the coating film 212 also can be formed on the effective surface 211 located on the image side of the lens module 100. The coating film 212 is used to reduce the reflectivity of the light incident on the first lens 21, thereby reducing the visibility of the ghosts and improving the imaging quality of the lens module 100.

The coating film 212 satisfies a following relationship:

A first relationship: $B_1 < 0.5\%; B_2 < 0.35\%$.

A second relationship: $A_1 < 1\%; A_2 < 0.5\%$.

A third relationship:

$$\frac{A_1 + B_1}{2} < 0.6\%.$$

$B_1$ refers to a maximum value of a reflectivity of incident light incident on the effective surfaces with the at least one coating film 212 thereon; and $B_2$ refers to an average value of the reflectivity of the incident light incident on the effective surfaces with the at least one coating film 212 thereon, a wavelength of the incident light being in a range of 490 nm to 620 nm. $A_1$ refers to a maximum value of the reflectivity of the incident light incident on the effective surfaces with the at least one coating film thereon; and $A_2$ refers to an average value of the reflectivity of the incident light incident on the effective surfaces with the at least one coating film 212 thereon, a wavelength of the incident light being in a range of 420 nm to 490 nm.

The formula 1 is mainly to limit the reflectivity of a green light band to reduce a color of a green arc in the ghosts and improve the imaging quality of the lens module 100. The formula 2 is mainly to limit the reflectivity of a blue light band to reduce a color of a blue arc in the ghosts and improve the imaging quality of the lens module 100.

In at least one embodiment, the gasket 50 is formed between the fourth lens 24 and the fifth lens 25 to maintain an air gap between the fourth lens 24 and the fifth lens 25. An inner hole 53 is defined in a middle of the gasket 50. The inner hole 53 transmits light. The inner hole 53 has an aperture that increases progressively from the object side to the image side.

In at least one embodiment, the stopper 60 is formed behind the fifth lens 25 and fixed in the lens cone 10 to stop the lens group 20 from sliding out of the lens barrel 10. A size of an outer diameter of the stopper 60 matches that of the inner wall of the lens cone 10 to meet a size of an air gap of the optical design.

In at least one embodiment, the light-shielding sheet group 70 includes a first light-shielding sheet 71, a second light-shielding sheet 72, a third light-shielding sheet 73, a fourth light-shielding sheet 74, and a fifth light-shielding sheet 75. The first light-shielding sheet 71, the second light-shielding sheet 72, the third light-shielding sheet 73, the fourth light-shielding sheet 74, and the fifth light-shielding sheet 75 are sequentially mounted in the lens cone 10 from the object side of the lens module 100 to the image side of the lens module 100. The first light-shielding sheet 71 is mounted between the first lens 21 and the second lens 22. The second light-shielding sheet 72 is mounted between the second lens 22 and the third lens 23. The third light-shielding sheet 73 is mounted between the third lens 23 and the fourth lens 24. The fourth light-shielding sheet 74 is mounted between the fourth lens 24 and the gasket 50. The fifth light-shielding sheet 75 is mounted between the gasket 50 and the fifth lens 25.

A first through hole 711 is defined in a middle of the first light-shielding sheet 71. A second through hole 721 is defined in a middle of the second light-shielding sheet 72. A third through hole 731 is defined in a middle of the third light-shielding sheet 73. A fourth through hole 741 is defined in a middle of the fourth light-shielding sheet 74. A fifth through hole 751 is defined in a middle of the fifth light-shielding sheet 75.

Referring to FIG. 3, an incident light L1 passes through the first lens 21 and reflects on a surface of the second lens 22 to form a first reflecting light L2. The first reflecting light L2 is reflected to the first lens 21 and is reflected by the coating film 212 to form a second reflecting light L3. The second reflecting light L3 passes through the first lens 21, the second lens 22, the third lens 23, the fourth lens 24, and the fifth lens 25 and shoots on the sensor 40 to form an image. The coating film 212 can reduce the reflectivity of the light incident on the coating film 212.

Figure 4:
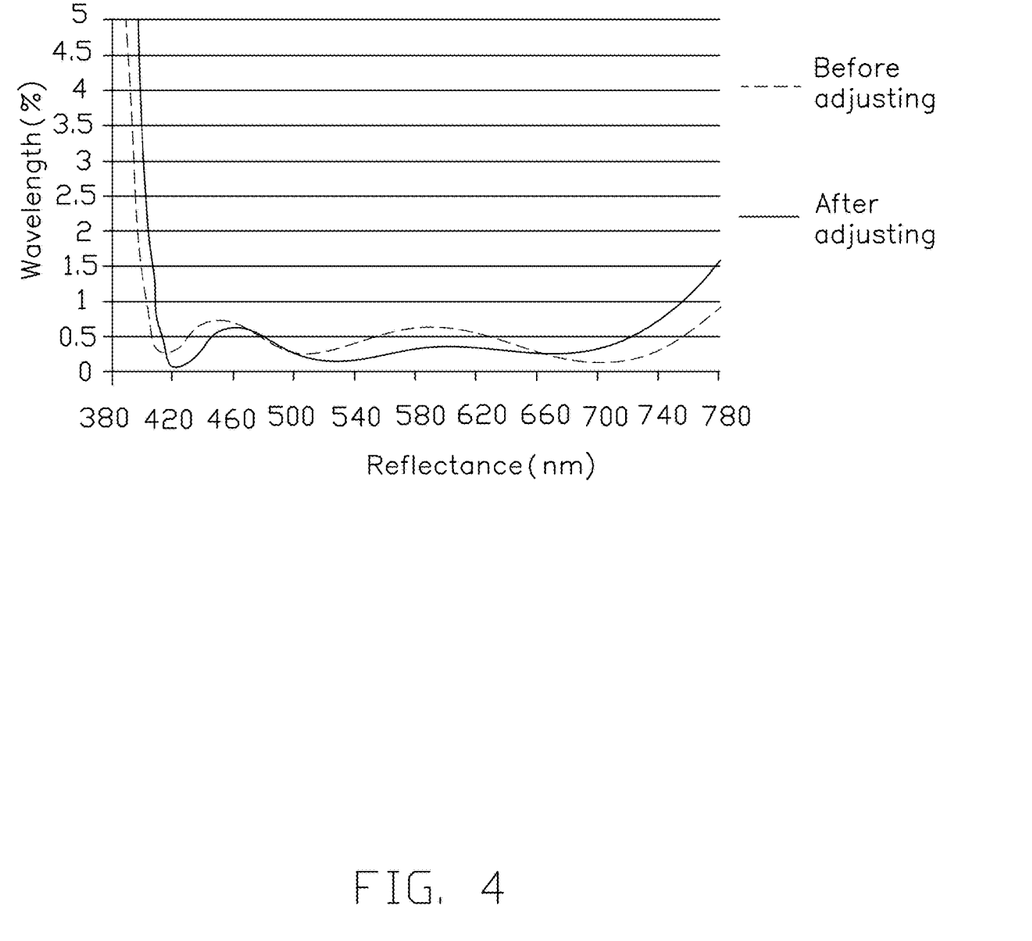
FIG. 4 is a comparison graph of a reflectivity of light with different wavelengths on an adjusted coating film and an unadjusted coating film.
Figure 5:
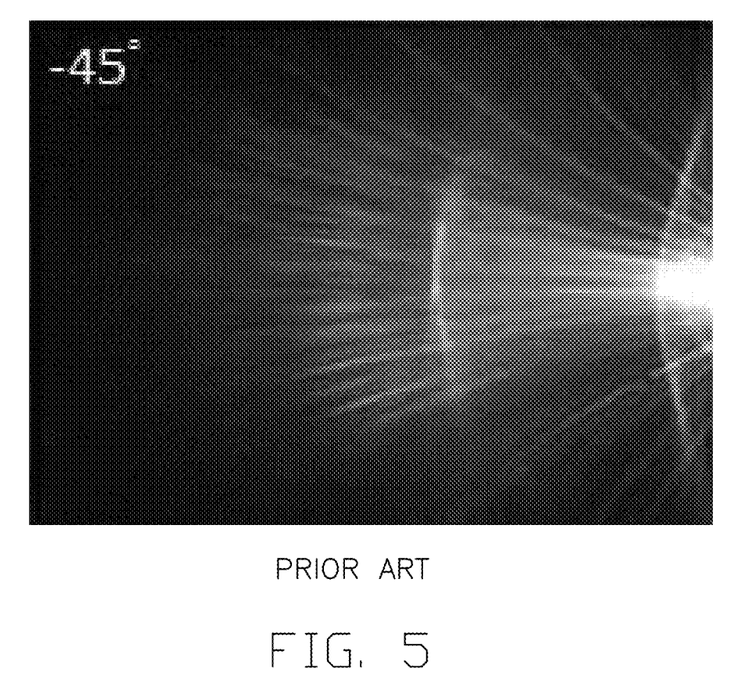
FIG. 5 is a photograph of a lens module in the prior art. (Please add (PRIOR ART) under the photo.)
Figure 6:
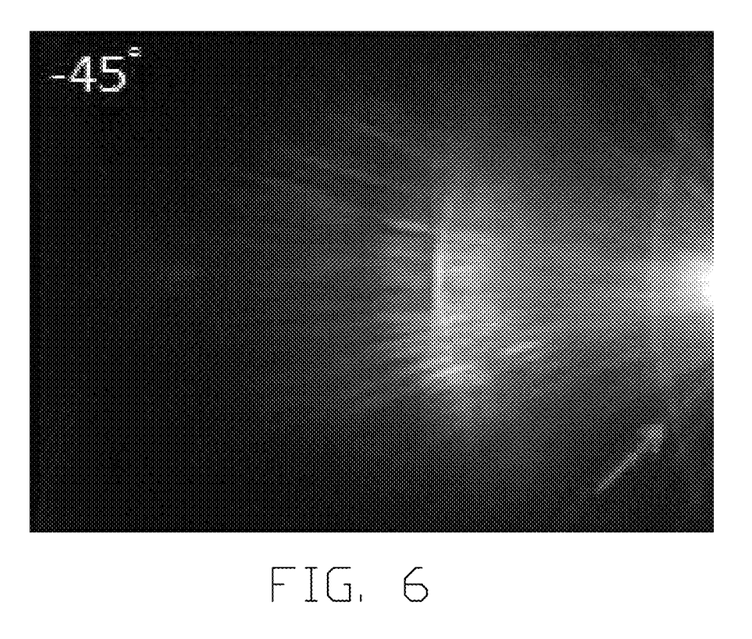
FIG. 6 is a photograph of the lens module of FIG. 1.

Referring to FIGS. 4-6, adjusting coating parameters to make the reflectivity of light incident on the coating film 212 is within a certain range can effectively reduce the color and the visibility of the ghosts, thereby improving the imaging quality of the lens module 100.

Figure 7:
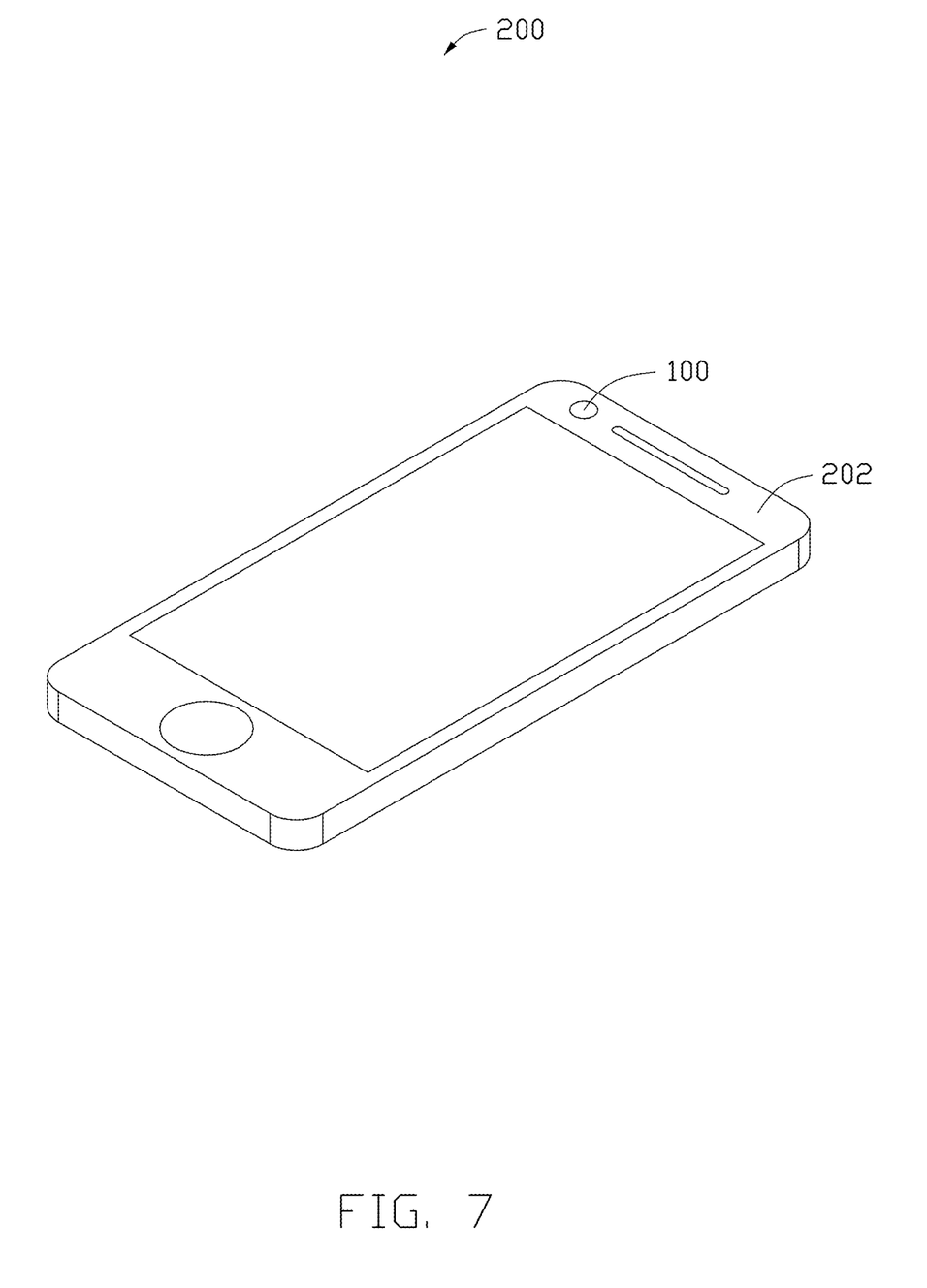
FIG. 7 is a perspective view of an electronic device.

FIG. 7 shows an embodiment of an electronic device 200. The electronic device 200 includes a body 202 and the lens module 100 mounted in the body 202. The electronic device 200 may be a smart phone, a tablet computer, or the like. In at least one embodiment, the electronic device 200 is a smart phone.

With the embodiments described above, the reflectivity of light incident on the coating film 212 is within a certain range by adjusting coating parameters can effectively reduce the color and the visibility of the ghosts, thereby improving the imaging quality of the lens module 100.

The embodiments shown and described above are only examples. Many details are often found in the art such as the other features of a lens module and an electronic device using the lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
   a lens group, wherein the lens group comprises a plurality of lenses arranged successively from an object side of the lens module to an image side of the lens module; each of the plurality of lenses has two effective surfaces; one of the two effective surfaces is located on the object side of the lens module, and the other one of the two effective surfaces is located on the image side of the lens module; and at least one coating film formed on at least one of the effective surfaces; wherein each of the at least one coating film satisfies a first relationship:

$B_1 < 0.5\%; B_2 < 0.35\%;$ wherein $B_1$ refers to a maximum value of a reflectivity of incident light incident on the effective surfaces with the at least one coating film thereon; and $B_2$ refers to an average value of the reflectivity of the incident light incident on the effective surfaces with the at least one coating film thereon, a wavelength of the incident light being in a range of 490 nm to 620 nm.

2. The lens module of claim 1, wherein each of the at least one coating film further satisfies a second relationship:

$A_1 < 1\%; A_2 < 0.5\%;$ wherein $A_1$ refers to a maximum value of the reflectivity of the incident light incident on the effective surfaces with the at least one coating film thereon; and $A_2$ refers to an average value of the reflectivity of the incident light incident on the effective surfaces with the at least one coating film thereon, a wavelength of the incident light being in a range of 420 nm to 490 nm.

3. The lens module of claim 2, wherein each of the at least one coating film further satisfies a third relationship:

$$\frac{A_1 + B_1}{2} < 0.6\%.$$

4. The lens module of claim 1, further comprising a lens cone, a filter, and a sensor, wherein the lens group is fixed in the lens cone; the lens group, the filter, and the sensor are sequentially arranged from the object side to the image side; the filter is formed on the sensor and faces the lens group; and the sensor faces the lens group.

5. The lens module of claim 4, further comprising a gasket formed between adjacent two of the plurality of lenses on the image side, the gasket maintains an air gap between the adjacent two lenses of the lens group on the image side of the lens module.

6. The lens module of claim 5, further comprising a light-shielding sheet group, wherein the light-shielding sheet group comprises a plurality of light-shielding sheets; and the plurality of light-shielding sheets respectively formed between adjacent two lenses of the lens group and formed between the lens of the lens group and the gasket.

7. The lens module of claim 6, further comprising a stopper closed to a last lens of the plurality of lens from the object side to the image side and fixed in the lens cone to stop the lens group from sliding out of the lens cone.

8. The lens module of claim 7, wherein the lens group comprises a first lens, a second lens, a third lens, a fourth lens, and a fifth lens, which are sequentially mounted in the lens cone from the object side of the lens module to the image side of the lens module; wherein the at least one coating film is formed on the effective surface of the first lens located on the object side of the lens module; and the gasket is formed between the fourth lens and the fifth lens.

9. The lens module of claim 8, wherein the light-shielding sheet group comprises a first light-shielding sheet, a second light-shielding sheet, a third light-shielding sheet, a fourth light-shielding sheet, and a fifth light-shielding sheet; wherein the first light-shielding sheet is mounted between the first lens and the second lens; the second light-shielding sheet is mounted between the second lens and the third lens; the third light-shielding sheet is mounted between the third lens and the fourth lens; the fourth light-shielding sheet is mounted between the fourth lens and the gasket; and the fifth light-shielding sheet is mounted between the gasket and the fifth lens.

10. The lens module of claim 9, wherein a first through hole is defined in a middle of the first light-shielding sheet; a second through hole is defined in a middle of the second light-shielding sheet; a third through hole is defined in a middle of the third light-shielding sheet; a fourth through hole is defined in a middle of the fourth light-shielding sheet; and a fifth through hole is defined in A middle of the fifth light-shielding sheet.

11. The lens module of claim 8, wherein the stopper is closed to the fifth lens.

12. The lens module of claim 5, wherein an inner hole is defined in a middle of the gasket; and the inner hole transmits light.

13. An electronic device, comprising:
a body; and
a lens module mounted in the body comprising:
a lens group, wherein the lens group comprises a plurality of lenses arranged successively from an object side of the lens module to an image side of the lens module; each of the plurality of lenses has two effective surfaces; one of the two effective surfaces is located on the object side of the lens module, and the other one of the two effective surfaces is located on the image side of the lens module; and
at least one coating film formed on at least one of the effective surfaces;
wherein each of the at least one coating film satisfies a first relationship:

$B_1 < 0.5\%; B_2 < 0.35\%;$ wherein $B_1$ refers to a maximum value of a reflectivity of incident light incident on the effective surfaces with the at least one coating film thereon; and $B_2$ refers to an average value of the reflectivity of the incident light incident on the effective surfaces with the at least one coating film thereon, a wavelength of the incident light being in a range of 490 nm to 620 nm.

14. The electronic device of claim 13, wherein each of the at least one coating film further satisfies a second relationship:

$A_1 < 1\%; A_2 < 0.5\%;$ wherein $A_1$ refers to a maximum value of the reflectivity of the incident light incident on the effective surfaces with the at least one coating film thereon; and $A_2$ refers to an average value of the reflectivity of the incident light incident on the effective surfaces with the at least one coating film thereon, a wavelength of the incident light being in a range of 420 nm to 490 nm.

15. The electronic device of claim 14, wherein each of the at least one coating film further satisfies a third relationship:

$$\frac{A_1 + B_1}{2} < 0.6\%.$$

16. The electronic device of claim 13, wherein the lens module further comprises a lens cone, a filter, and a sensor, wherein the lens group is fixed in the lens cone; the lens group, the filter, and the sensor are sequentially arranged from the object side to the image side; the filter is formed on the sensor and faces the lens group; and the sensor faces the lens group.

17. The electronic device of claim 16, wherein the lens module further comprises a gasket formed between adjacent two of the plurality of lenses on the image side, the gasket maintains an air gap between the adjacent two lenses of the lens group on the image side of the lens module.

18. The electronic device of claim 17, wherein the lens module further comprises a light-shielding sheet group, wherein the light-shielding sheet group comprises a plurality of light-shielding sheets; and the plurality of light-shielding sheets respectively formed between adjacent two lenses of the lens group and formed between the lens of the lens group and the gasket.

19. The electronic device of claim 18, wherein the lens module further comprises a stopper closed to a last lens of the plurality of lens from the object side to the image side and fixed in the lens cone to stop the lens group from sliding out of the lens cone.

\* \* \* \* \*